Patented June 14, 1932

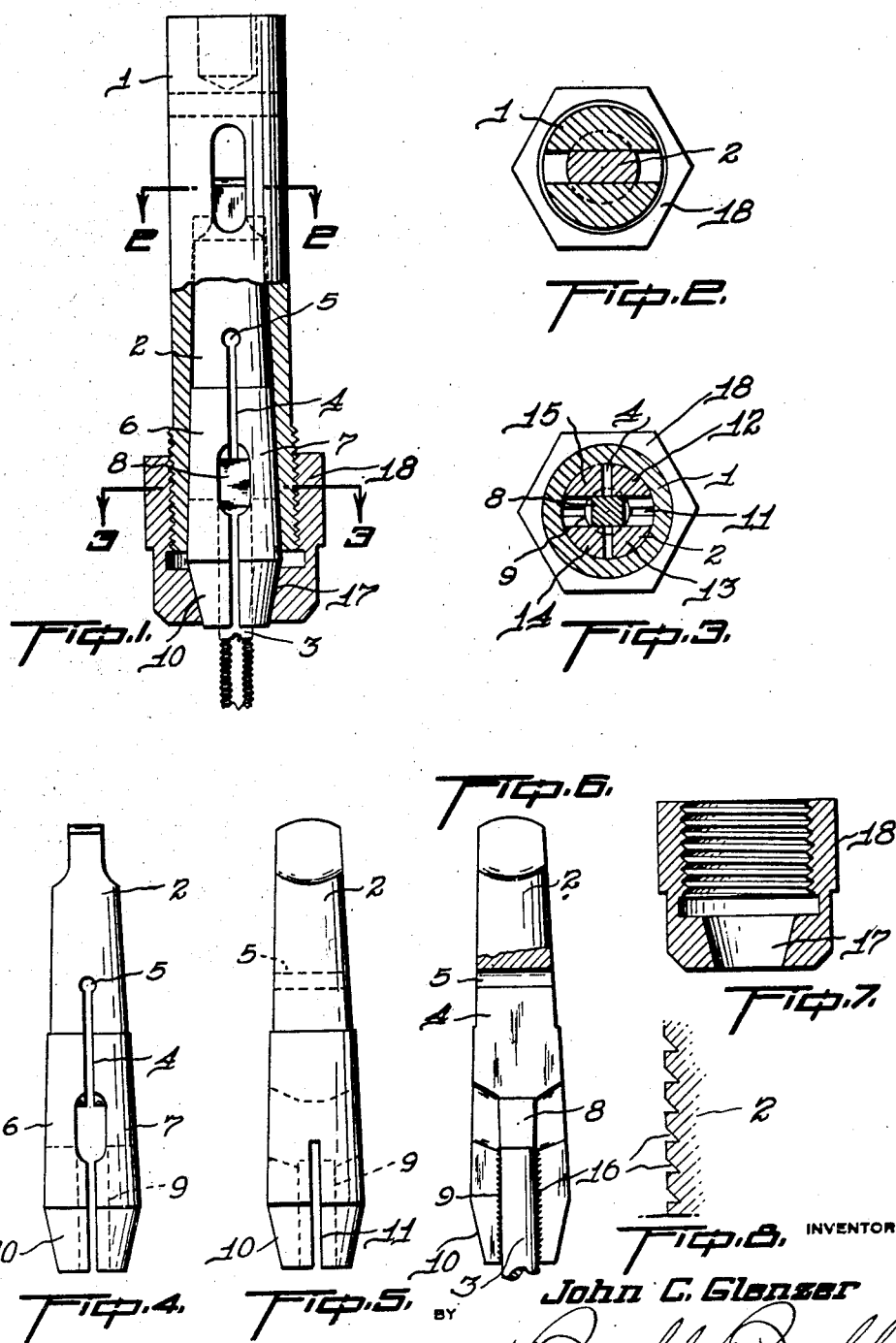

1,863,108

UNITED STATES PATENT OFFICE

JOHN C. GLENZER, OF DETROIT, MICHIGAN

TOOL HOLDER

Application filed July 18, 1930. Serial No. 468,864.

This invention relates to an improvement in tool drivers used in drilling and tapping machines and particularly to an improvement in such tool drivers as is disclosed and described in my co-pending application for United States Letters Patent filed by me March 7, 1929, Serial No. 344,958.

In some operations the head of the drilling machine carrying the gang of drill spindles resists the advance of the tool into the work and the work prevents withdrawal of the tool, with the result that a tractile force is exerted on the tool and its holder to pull one or both out of the drill sleeve.

My new device is designed to prevent the tool or the tool holder pulling out and to increase the clamping action on the tool when there is a pull exerted.

Another object is to more positively assure true centering of the tool in the holder.

With the present device, machines not originally designed for such work as tapping and the spindle carrying head of which may be heavier than those customarily found in machines designed especially for tapping, may be readily used and made adaptable to this kind of work.

With these and other objects in view, the invention consists of the features of construction, combination and arrangement of parts hereinafter fully described and claimed. reference being had to the accompanying drawing in which—

Figure 1 is a view partly in elevation and partly in section showing a tap in place in the drill holder with the drill holder inserted in the drill sleeve and the clamping nut;

Fig. 2 is a sectional view on the line 2—2 of Fig. 1;

Fig. 3 is a sectional view on the line 3—3 of Fig. 1;

Fig. 4 is a view in elevation of the tool holder;

Fig. 5 is another view in elevation of the tool holder turned quarter round from the view in Fig. 4;

Fig. 6 is an elevation of the tool holder with one of its sections removed;

Fig. 7 is a sectional view of the clamping nut; and

Fig. 8 is an enlarged view of a detail serrated bore of the tool holder.

Referring to the drawing, 1 is a drill sleeve adapted to be attached to the spindle of the machine and 2 is a tool holder recessed to receive a shank of a tap 3 and slotted longitudinally as at 4, the closed end of the slot 4 is made circular as at 5 to add to the resiliency of the jaws 6 and 7 made by the slot 4.

The tool holder is made having its exterior wall conical in form tapering towards the end of the tool holder remote from the tool receiving end of the holder. The drill sleeve 1 which holds the tool holder receives whatever pressure is derived from the machine transmitting the same to the jaws 6 and 7 to increase their clamping action on the tool held between the jaws with the result that as true centering of the tool as is possible is obtained.

This portion of the tool holder is bored to receive the tool having a squared surface 8 to engage the tang of the tool and the cylindrical bore 9 to engage the shank of the tool.

The tool holder is provided with a conical end portion 10 tapered towards the tool through which end portion the slot 4 is carried and the slot 11 is cut, extending into the intermediate conical portion constituted by the jaws 6 and 7 and providing thereby jaws 12, 13, 14 and 15. The bore within this end portion is serrated as shown at 16 in order to more securely hold the tool against withdrawal. The form of serration shown resists the movement of a shank of the tool out of the holder, thereby directing some of the tractile force acting on the tool through the tapering jaws 12, 13, 14 and 15 towards and against the complementary face 17 of the nut 18. The drill sleeve is threaded at the tool receiving end to engage the nut 18 and hold the same firmly against longitudinal movement. When there is a pull exerted between the tool and the drill sleeve, the jaws of the end portion are clamped more tightly on the shank of the tool by reason of the slight longitudinal movement through the tapered opening 17, thereby constricting the circumference of the bore within said end portion.

It will be readily seen that my present device may be capable of a number of diverse applications where resistance to oppositely working forces is required in order to hold securely a tool within a tool holder working within a driving member as constituted by the drill sleeve 1. It will also be readily seen that the principle herein disclosed may be the subject of a number of modifications, all of which have the principle of attached portions of a tool holder one of which is contractible on a force acting in one direction while the other is contractible by a force acting in an opposite direction.

Although a specific embodiment of the invention has been illustrated and described, it will be understood that various alterations in the details of construction may be made without departing from the scope of the invention as indicated by the appended claims.

What I claim is:—

1. In combination, an elongated drill sleeve adapted at one end for attachment to the spindle of a drilling machine and having an axial recess in the major portion thereof flaring gradually larger toward and opening through the other end of the same, a tool holder adapted for direct insertion in the drill sleeve and comprising a one-piece body having a driving tang at one end and flaring gradually larger toward its other tool-receiving end and having a slot extending diametrically through and bifurcating the larger major end portion thereof to provide a pair of opposed jaws adapted to clamp a tool therebetween, the flaring surfaces of the drill sleeve and tool holder coacting to cause gripping of the tool shank by said jaws with a force proportional to the pressure exerted on the tool toward the drill sleeve, said larger end portion of the tool holder being bored to provide inner flat faces intermediate the ends of the slot to engage the inner end and opposite sides of the squared tang of the tool and an outer cylindrical bore portion to engage the cylindrical shank of the tool, the outer portion of the tool receiving end of the tool holder tapering gradually smaller toward the end thereof, and a member detachably secured on said other end of the drill sleeve and having a gradually tapering inner face coacting with the last-named tapered portion of the tool holder to cause gripping of the tool shank by said jaws with a force proportional to any pull exerted between the tool and the drill sleeve.

2. In combination, an elongated drill sleeve adapted at one end for attachment to the spindle of a drilling machine and having an axial recess in the major portion thereof flaring gradually larger toward and opening through the other end of the same, said drill sleeve being externally threaded adjacent said other end, a tool holder adapted for direct insertion in the drill sleeve and comprising a one-piece body having a driving tang at one end and flaring gradually larger toward its other tool receiving end and having a slot extending diametrically through and bifurcating the larger major end portion thereof to provide a pair of opposed main jaws adapted to clamp a tool therebetween, the flaring surfaces of the drill sleeve and tool holder coacting to cause gripping of the tool shank by said jaws with a force proportional to the pressure exerted on the tool toward the drill sleeve, said larger end portion of the tool holder being bored to provide inner flat faces intermediate the ends of the slot to engage the inner end and opposite sides of the squared tang of the tool and an outer serrated cylindrical bore portion to engage the cylindrical shank of the tool, the outer portion of the tool receiving end of the tool holder tapering gradually smaller toward the end thereof, and a nut threaded on said other end of the drill sleeve and having a gradually tapering inner face coacting with the last-named tapered portion of the tool holder to cause gripping of the tool shank by said jaws with a force proportional to any pull exerted between the tool and the drill sleeve, said tool holder having a further slot diametrically therethrough at right angles to and shorter than the first-named slot to longitudinally divide the inner ends of the main jaws.

In testimony whereof I affix my signature.

JOHN C. GLENZER.